United States Patent
Best et al.

(10) Patent No.: US 7,844,596 B2
(45) Date of Patent: Nov. 30, 2010

(54) SYSTEM AND METHOD FOR AIDING FILE SEARCHING AND FILE SERVING BY INDEXING HISTORICAL FILENAMES AND LOCATIONS

(75) Inventors: Steven F. Best, Georgetown, TX (US); Robert J. Eggers, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 11/697,839

(22) Filed: Apr. 9, 2007

(65) Prior Publication Data

US 2008/0250017 A1 Oct. 9, 2008

(51) Int. Cl.
*G06F 7/00* (2006.01)
*G06F 17/30* (2006.01)

(52) U.S. Cl. .................. 707/711; 707/741; 707/752; 707/782

(58) Field of Classification Search .............. 707/1–6, 707/200, 202, 711, 716, 741, 752, 753, 782, 707/796, 830
See application file for complete search history.

(56) References Cited

U.S. PATENT DOCUMENTS

| | | | |
|---|---|---|---|
| 5,513,351 A | 4/1996 | Grantz | |
| 5,572,729 A * | 11/1996 | Giordano et al. ................ | 1/1 |
| 6,002,402 A | 12/1999 | Schacher | |
| 6,286,013 B1 * | 9/2001 | Reynolds et al. ............ | 719/328 |
| 6,330,567 B1 | 12/2001 | Chao | |
| 6,766,334 B1 * | 7/2004 | Kaler et al. ..................... | 1/1 |
| 6,981,210 B2 | 12/2005 | Peters et al. | |
| 7,054,927 B2 | 5/2006 | Ulrich et al. | |
| 7,444,317 B2 * | 10/2008 | Pudipeddi et al. .............. | 1/1 |
| 7,743,111 B2 * | 6/2010 | Soltis ........................ | 709/217 |
| 2003/0063321 A1 * | 4/2003 | Inoue et al. ................ | 358/302 |
| 2005/0120060 A1 * | 6/2005 | Meng ........................ | 707/202 |
| 2006/0031265 A1 | 2/2006 | Ramaley et al. | |
| 2006/0184892 A1 | 8/2006 | Morris | |
| 2008/0228843 A1 * | 9/2008 | Dodge et al. .............. | 707/205 |

OTHER PUBLICATIONS

"A Better Finder Rename, Version 7," pp. 1-3, http://publicspace.net/ABetterFinderRename/Manual_Main_Dialog.html.

* cited by examiner

*Primary Examiner*—Wilson Lee
*Assistant Examiner*—Merilyn P Nguyen
(74) *Attorney, Agent, or Firm*—Dillon & Yudell LLP

(57) ABSTRACT

A system, method, and computer-implementable method for aiding file searching within a file service by indexing historical filenames and locations. In response to receiving a request to alter a first name corresponding to a file within the file system to a second name, a file system manager associates the second name to the first name and to the file within the file system data structure. When receiving a request for a file, wherein the request includes the first name, the file system manager searches the file system for the file based on the first name. When determining the search based on the first name is not successful, the file system manager searches the file system data structure for the file based on the second name. When the second name is located within the file system data structure, the file system manager returns the file to fulfill the request.

17 Claims, 6 Drawing Sheets

| | 306a | 306b | ... | 306n |
|---|---|---|---|---|
| Current Filename 300a | renamedtext.txt | | ... | |
| Current Location 300b | C:/Current Location/ | | ... | |
| Previous Filename 1 302a | firstnametext.txt | | ... | |
| Previous Location 1 302b | C:/Old Location/ | | ... | |
| ... | ... | ... | ... | ... |
| Previous Filename n 304a | firstnametext.txt | | ... | |
| Previous Location n 304b | http://www.webpage.com/textfiles | | ... | |
| File destroyed? 308 | No | | ... | |

SYSTEM AND METHOD FOR AIDING FILE SEARCHING AND FILE SERVING BY INDEXING HISTORICAL FILENAMES AND LOCATIONS

BACKGROUND OF THE INVENTION

1. Technical Field

The present invention relates in general to the field of data processing systems and specifically, the field of storing data on data processing systems. Still more specifically, the present invention relates to a system and method for organizing data stored in data processing systems.

2. Description of the Related Art

In modern computer systems, a file system stores and organizes computer files to enable a user to efficiently locate and access requested files. File systems may utilize a storage device such as a hard disk drive to provide local access or provide access to data stored on a remote file server. A file system can also be characterized as a set of abstract data types that are implemented for the storage, hierarchical organization, manipulation, navigation, access, and retrieval of data.

The most familiar file systems utilize an underlying data storage device that offers access to an array of fixed-sized blocks, called "sectors". The file system software is responsible for organizing these sectors into files and directories. The file system software also keeps track of which sectors are occupied and which are unused.

However, file systems do not need to make use of a storage device at all. A file system can be utilized to organize and represent access to any data, whether the data is stored or dynamically generated (e.g., from a network connection). Whether the file system has an underlying storage device or not, file systems typically have directories that associate file names with files, usually by connecting the file name to an index into a file allocation table (e.g., FAT in an MS-DOS file system or an inode in a Unix-like file system). Directory structures may be flat or may allow hierarchies where directories may include subdirectories. In some file systems, file names are structured, with special syntax for filename extensions and version numbers. In other file systems, file names are simple strings, and per-file metadata is stored elsewhere.

Other bookkeeping information is also associated with each file within a file system. The length of the data contained in the file may be stored as the number of blocks allocated for the file or as an exact byte count. The time that the file was last modified may be stored as a file's timestamp. Some file systems also store the file creation time, the time the file was last accessed, and the time the file's metadata was changed. Other information can include the file's device type (e.g., block, character, socket, subdirectory, etc.), the file's owner user-ID and group-ID, and the file's access permission settings (e.g., whether the file is read-only, executable, etc.).

While file systems enable a user to save, find, and/or access files within a computer system or network, the organization of the directory structure and the names of individual files may be altered. The altering of the directory structure and file names is usually manageable when only a single user has access to a particular directory structure within a computer. However, if more than one user has access to the directory structure, other users may have trouble finding the files after the directory structure and/or file names have been changed by a particular user.

Therefore, there is a need for a system and method for efficiently tracking changes made to a directory structure for convenient access to files within a data processing system.

SUMMARY OF THE INVENTION

The present invention includes a system, method, and computer-implementable method for aiding file searching within a file service by indexing historical filenames and locations. In response to receiving a request to alter a first name corresponding to a file within the file system to a second name, a file system manager associates the second name to the first name and to the file within the file system data structure. When receiving a request for a file, wherein the request includes the first name, the file system manager searches the file system for the file based on the first name. When determining the search based on the first name is not successful, the file system manager searches the file system data structure for the file based on the second name. When the second name is located within the file system data structure, the file system manager returns the file utilizing the second name as listed in the file system data structure, to fulfill the request.

The above, as well as additional purposes, features, and advantages of the present invention will become apparent in the following detailed written description.

BRIEF DESCRIPTION OF THE FIGURES

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying figures, wherein:

FIG. 3 is a block diagram depicting exemplary contents of a file system data structure according to an embodiment of the present invention.

DETAILED DESCRIPTION OF AN ILLUSTRATIVE EMBODIMENT

The present invention includes a system, method, and computer-implementable method for aiding file searching within a file service by indexing historical filenames and locations. In response to receiving a request to alter a first name corresponding to a file within the file system to a second name, a file system manager associates the second name to the first name and to the file within the file system data structure. When receiving a request for a file, wherein the request includes the first name, the file system manager searches the file system for the file based on the first name. When determining the search based on the first name is not successful, the file system manager searches the file system data structure for the file based on the second name. When the second name is located within the file system data structure, the file system manager returns the file utilizing the second name as listed in the file system data structure, to fulfill the request.

Figure 1A:
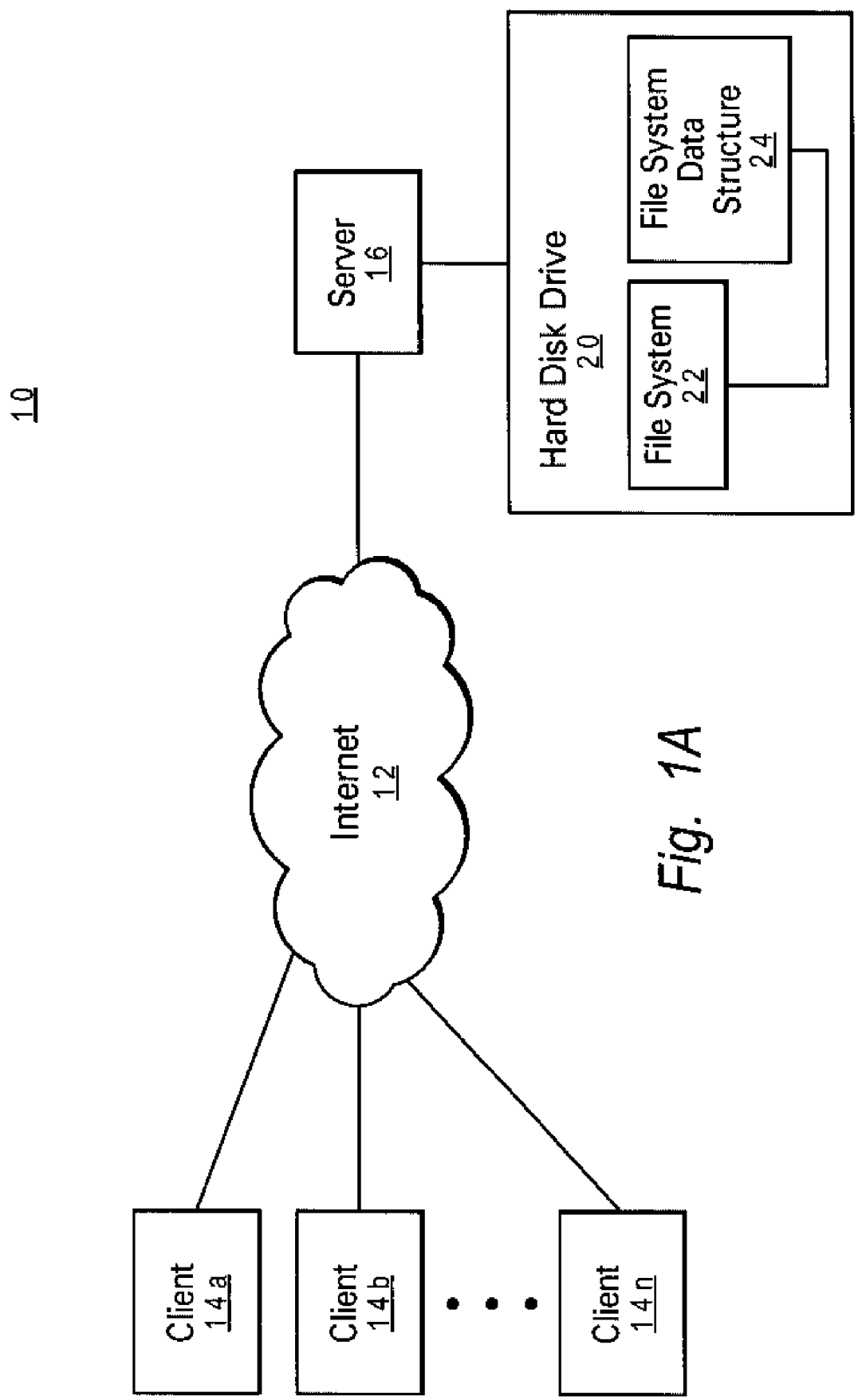
FIG. 1A is a block diagram illustrating an exemplary network in which an embodiment of the present invention may be implemented.

Referring now to the figures, and in particular, referring to FIG. 1A, there is illustrated a block diagram depicting an exemplary network 10 in which an embodiment of the present invention may be implemented. As illustrated, network 10 includes a collection of clients 14a-14n, Internet 12, and a server 16. Clients 14a-14n are coupled to server 16 via Internet 12. While Internet 12 is utilized to couple clients 14a-14n to server 16, those with skill in the art will appreciate that a local-area network (LAN) or wide-area network (WAN) utilizing Ethernet, IEEE 802.11x or any other communications protocol may be utilized.

In an embodiment of the present invention, server 16 is coupled to hard disk drive 20, which operates as a mass storage device. Those with skill in the art will appreciate that hard disk drive 20 can be implemented by a single hard disk drive, a redundant array of independent disks (RAID), or any other storage device configuration. Stored in hard disk drive 20 includes a file system 22 and a file system data structure 24. File system 22 organizes and stores files for access by server 16 and clients 14a-14n via Internet 12. File system data structure 24 includes a collection of records that are each associated with a file stored within file system 22. Each record includes historical filenames and storage locations to aid in file searches, as discussed in more detail in conjunction with FIG. 4. Those with skill in the art will appreciate that file system 22 may utilize any file format including, but not limited to, file allocation table (FAT), new technology file system (NTFS), or high performance file system (HPFS). Clients 14a-14n and server 16 are discussed in more detail in conjunction with FIG. 1B. Those with skill in the art will appreciate that exemplary network 10 may include other components such as routers, firewalls, etc. that are not germane to the discussion of the present invention and will be not discussed further herein.

Those with skill in the art will appreciate that the present invention may be implemented on a webserver (e.g., server 16) to facilitate file service to clients (e.g., clients 14a-14n). For example, a client (e.g., client 14a) requests a file by a first name from the webserver. If the file cannot be found via a search by the first name, the webserver can institute a search of file system data structure 24 to determine if the file has been renamed, removed, or relocated. If the file has been renamed, removed, or relocated, the webserver can merely retrieve the requested file from the new location (or return an error message) instead of returning a "file not found" (e.g., a 404 error) to the client after the unsuccessful search utilizing the first name.

Figure 1B:
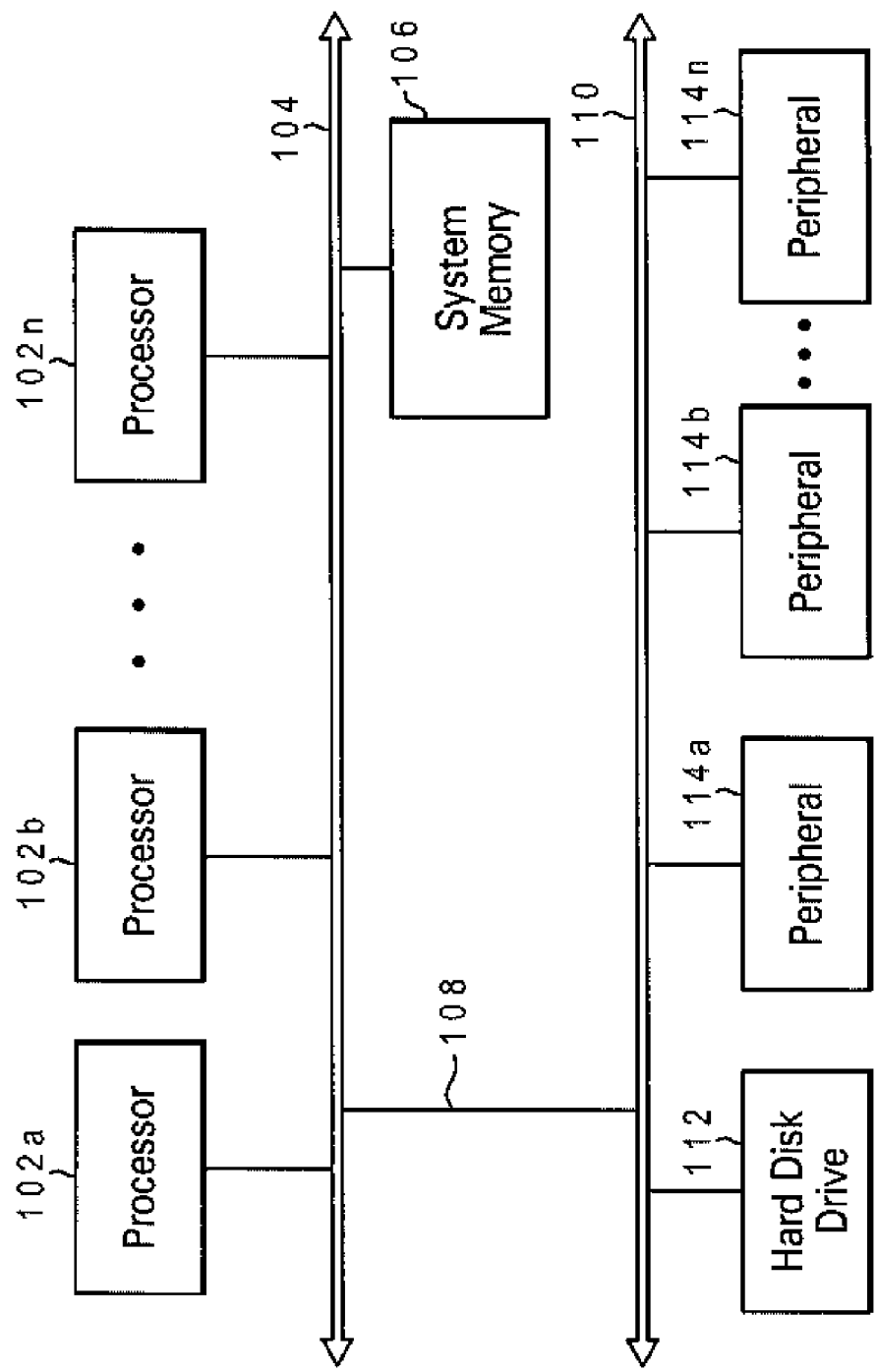
FIG. 1B is a block diagram depicting an exemplary data processing system in which an embodiment of the present invention may be implemented.

FIG. 1B is a block diagram depicting an exemplary data processing system 100 which may be utilized to implement clients 14a-14n and server 16 as shown in FIG. 1A. As illustrated, exemplary data processing system 100 includes a collection of processors 102-102n that are coupled to a system memory 106 via a system bus 104. System memory 104 may be implemented by dynamic random access memory (DRAM) modules or any other type of RAM module. Mezzanine bus 108 couples system bus 104 to peripheral bus 110. Coupled to peripheral bus 110 is a hard disk drive 112 for mass storage and a collection of peripherals 114a-114n, which may include, but are not limited to: optical drives, other hard disk drives, printers, input devices, etc. Those with skill in the art will appreciate that hard disk drive 112 may be utilized to implemented hard disk drive 20 in FIG. 1A.

Those with skill in the art will appreciate that data processing system 100 can include many additional components not specifically illustrated in FIG. 1B. Because such additional components are not necessary for an understanding of the present invention, they are not illustrated in FIG. 1B or discussed further herein. It should be understood, however, that the enhancements to data processing system 100 for enhancing environment variable and process option invocation provided by the present invention are applicable to data processing systems of any system architecture and are in no way limited to the generalized multi-processor architecture or symmetric multi-processing (SMP) architecture illustrated in FIG. 1B.

Figure 2:
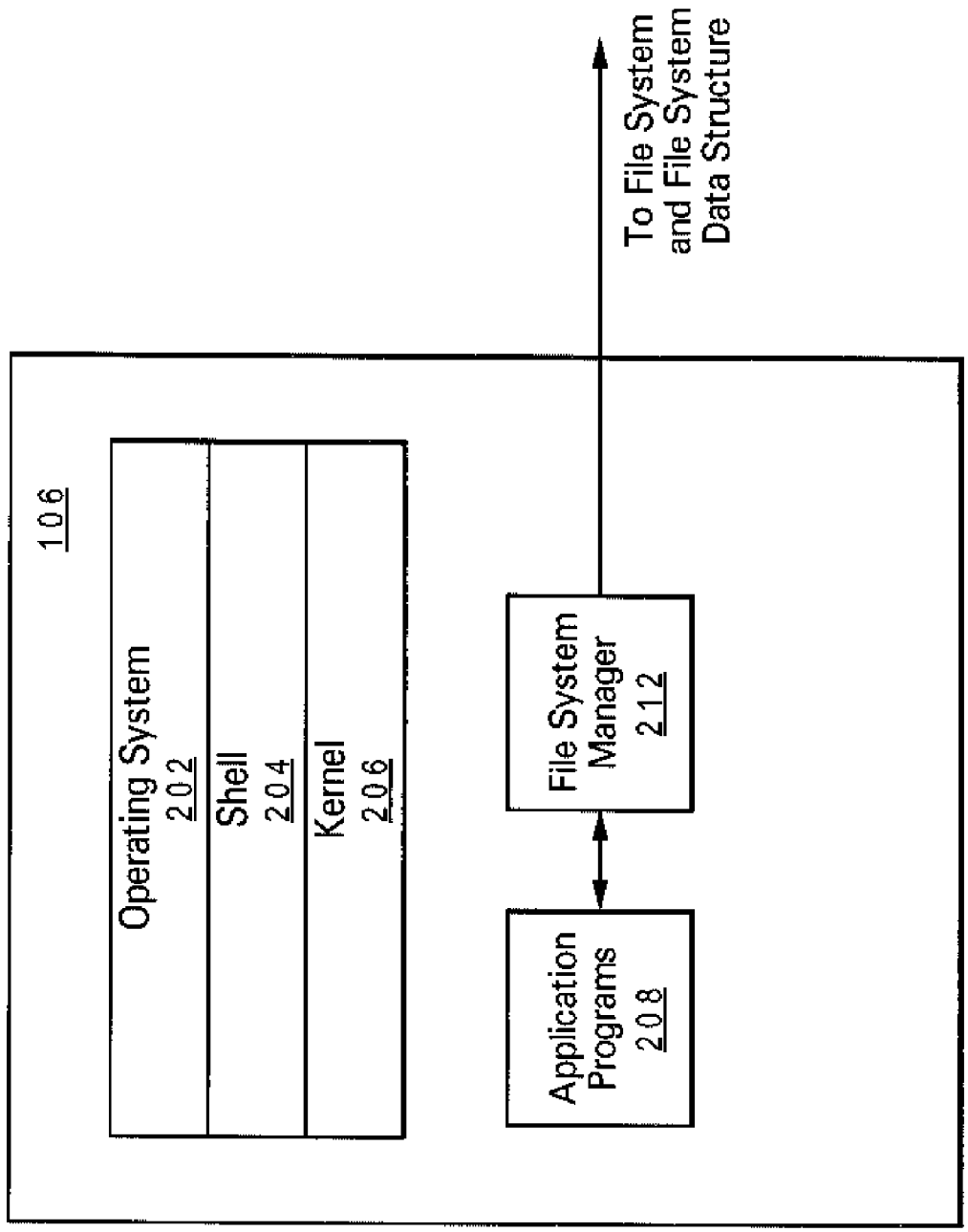
FIG. 2 is a block diagram illustrating exemplary contents of system memory according to an embodiment of the present invention.

FIG. 2 is a block diagram illustrating exemplary contents of system memory 106 of data processing system 100, according to a preferred embodiment of the present invention. As shown, system memory 106 includes operating system 202, which further includes shell 204 (as it is called in UNIX®) for providing transparent user access to resources such as application programs 208. Generally, shell 204 is a program that provides an interpreter and an interface between the user and the operating system. More specifically, shell 204 executes commands that are entered into a command line user interface or a file. Thus, shell 204, also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., kernel 206) for processing. Note that while shell 204 is a text-based, line-oriented user interface, the present invention will support other user interface modes, such as graphical, voice, gestural, etc. equally well.

As illustrated, operating system 202 also includes kernel 206, which includes lower levels of functionality for operating system 202 and application programs 208, including memory management, process and task management, disk management, and mouse and keyboard management. Application programs 208 can include a browser, utilized for access to Internet 12 (FIG. 1A), world processors, spreadsheets, and other application programs. Also, as depicted in FIG. 2, system memory 106 includes file system manager 212, which controls access to files stored within file system 22 (FIG. 1A) and updates file system data structure 24 (FIG. 1A). Those with skill in the art will appreciate that file system manager 212 may be implemented as part of file system 22 or as an external application or kernel module.

FIG. 3 is a more detailed block diagram depicting file system data structure 24 shown in FIG. 2. File system data structure includes a collection of records 306a-306n that correspond to files saved within file system 210. As illustrated in FIG. 3, each record 306a-306n further includes multiple fields. For example, record 306a includes current filename 300a, current location 300b, previous filename 1 302a, previous location 1 302b, previous filename n 304a, and previous location n 304b fields. Each time file system manager 212 (FIG. 2) modifies the name or location of a file located within file system 22 (FIG. 1A), file system manager 212 adds or modifies at least one field within a record corresponding to the modified file. Also, file system data structure 24 includes file destroyed field 308, which indicates whether or not the file associated with the record has been removed or destroyed. If the file has been removed (e.g., all copies the file including files with alternate names and/or locations), file destroyed field 308 will indicate "Yes".

Figure 4A:
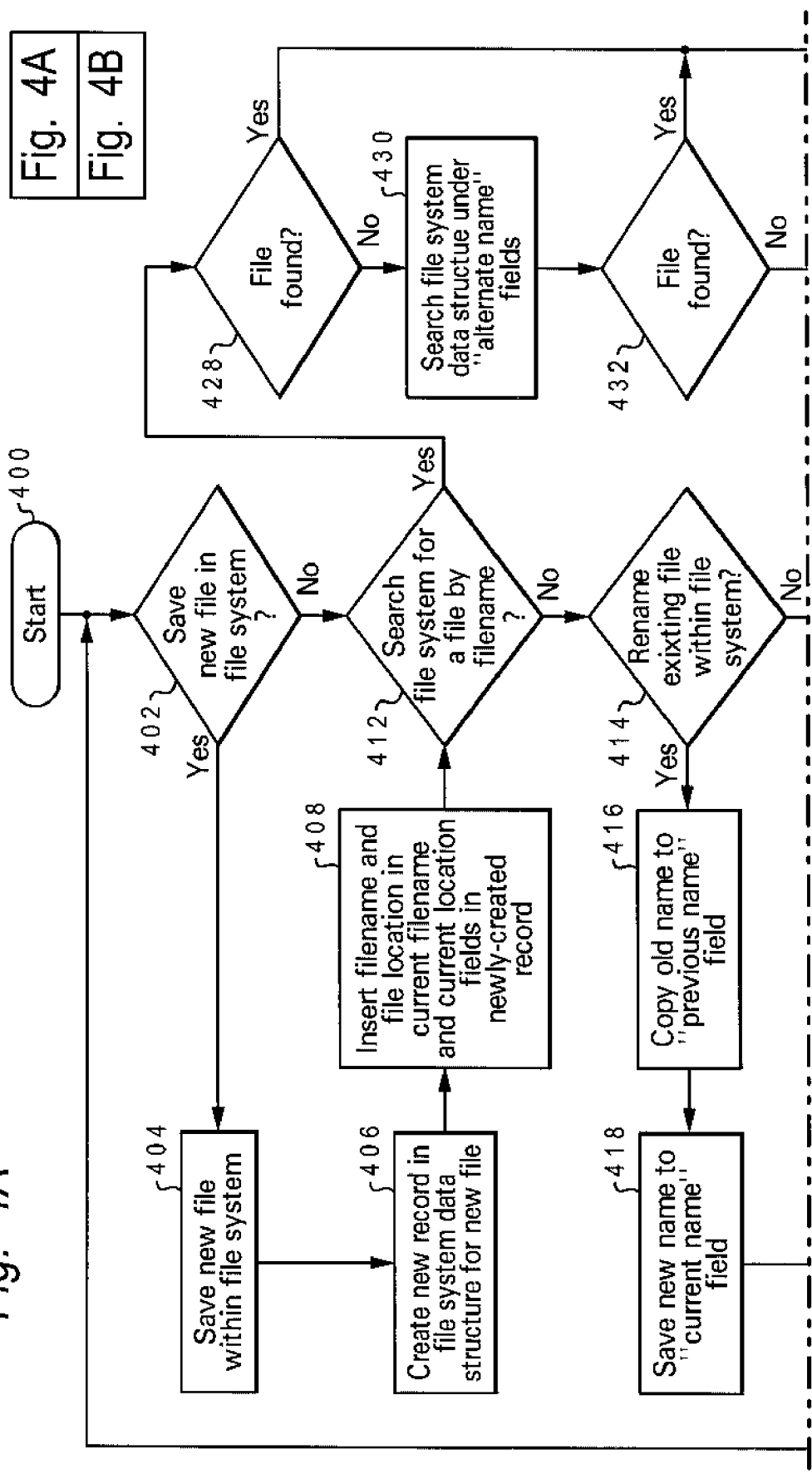
FIG. 4 is a high-level logical flowchart illustrating an exemplary method for aiding file searching within a file service by indexing historical filenames and locations according to an embodiment of the present invention.
Figure 4B:
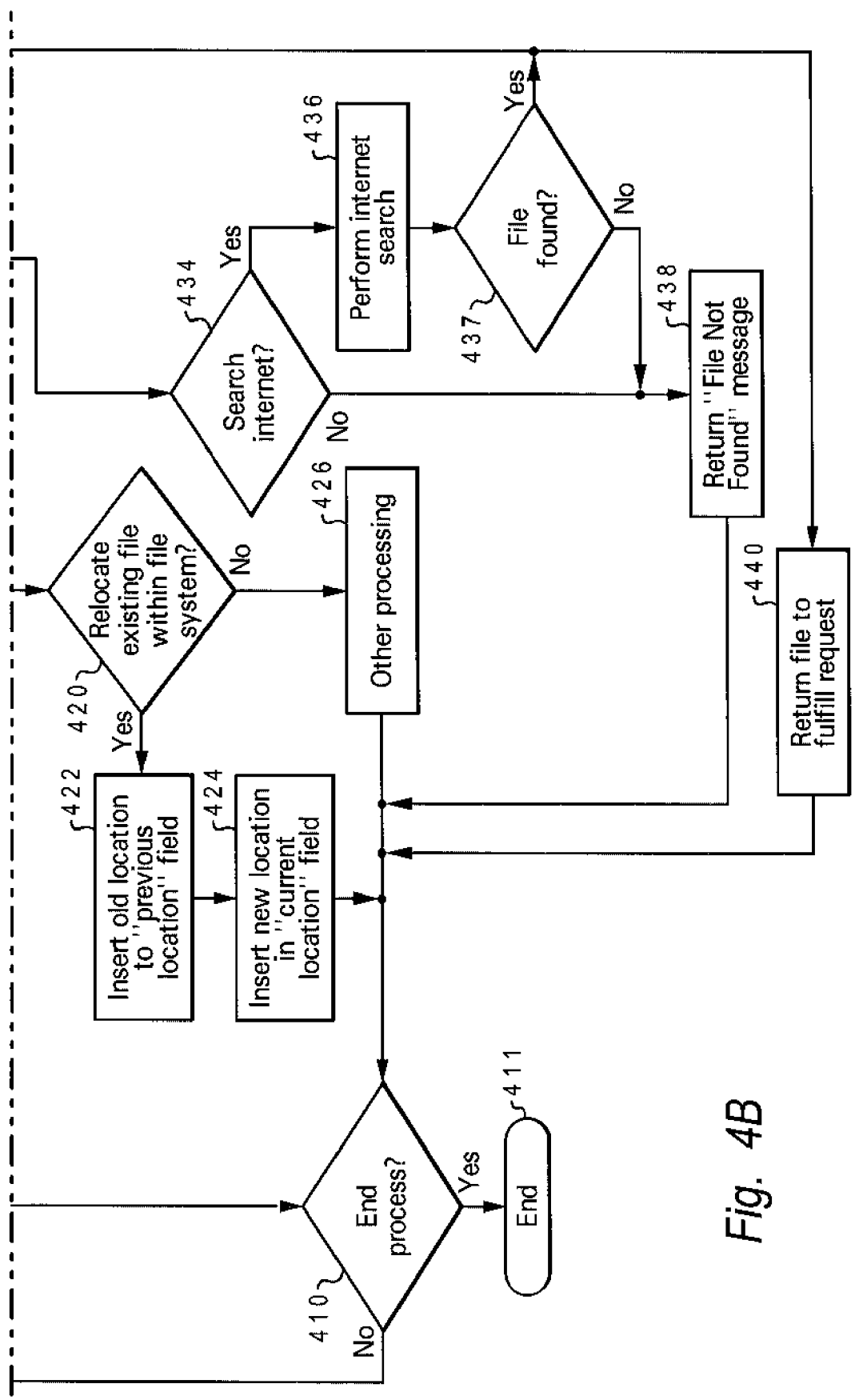

As discussed herein in more detail in conjunction with FIG. 4, when file system manager 212 saves a new file within file system 210, file system manager 212 creates a new record (e.g., record 306a-306n) within file system data structure 24 and associates the new record to the new file. File system manager 212 inserts the filename of the new file in current filename field 300a and inserts the location of the new file in current location field 300b.

If file system manager 212 receives a request to change the name of the file, file system manager 212 renames the file within file system 22 and inserts the original name of the file in a previous filename field (e.g., previous filename 1 field 302a). File system manager 212 then inserts the new name of the file in current filename field 300a. Each time the file is renamed, the previous names are inserted in the previous filename fields in the records within file system data structure 24. As necessary, additional previous filename fields may be added to each record.

If file system manager 212 receives a request to change the location of the file, file system manager 212 relocates the file within file system 22 and inserts the path of the original location in a previous location field (e.g., previous location 1 field 302b). File system manager 212 then inserts the new path of the file in current location field 300b. Each time the file is relocated, prior locations are inserted into the previous location fields in the records within file system data structure 24. If necessary, additional previous location fields may be added to each record. The multiple entries in each record 306a-306n associated enables file system manager 212 to keeping a record of all current and previous names of files to facilitate file searching.

The present invention may also allow for ordering of the previous filename/location fields within the records to facilitate the searching of the fields when searching for prior filenames/locations. For example, if a more recent filename/location is desired, the fields may be sorted starting from the most recent filename/location.

FIG. 4 is a high-level logical flowchart illustrating an exemplary method for aiding file searching and file service by indexing historical filenames and locations according to an embodiment of the present invention. The process begins at step 400 and proceeds to step 402, which illustrates file system manager 212 (FIG. 2) determining if a request to save a new file in file system 22 (FIG. 1A) has been received from an application from application programs 208. When file system manager 212 has received a request to save a new file in file system 22, the process continues to step 404, which depicts file system manager 212 saving the new file within file system 22. The process proceeds to step 406, which shows file system manager 212 creating a new record (e.g., record 306a-306n) within file system data structure 24 (FIG. 1A) and associating the new record to the new file. The process continues to step 412, which illustrates file system manager 212 determining if a request to search file system 22 for a file by filename has been received.

Returning to step 402, if file system manager 212 has not received a request to save a new file in file system 22, the process continues to step 412, which illustrates file system manager 212 determining if a request to search file system 22 by filename has been received. If a request to search file system 22 has been received, file system manager 212 searches file system 22 and determines if the requested file has been found, as depicted in step 428. If the requested file has been found, the process continues to step 440, which shows file system manager 212 sending the file to fulfill the file request. The process then continues to step 410, which illustrates file system manager 212 determining if the process is to end.

Returning to step 428, if the file has not been found, the process continues to step 430, which illustrates file system manager 212 searching file system data structure 24 via the previous name fields (e.g., previous filename 1 302a, previous filename n 302n, etc.). As previously discussed, file system manager 212 updates a record within file system data structure 24 with a new filename and/or new location information each time a file associated with that record is renamed and/or moved. The prior names/locations are inserted into the previous filename/previous location fields of the records. When a file is not found by an initial search of file system 22, file system manager 212 will search the records in file system data structure 24 by looking at the previous filename fields. If the requested file is found, the process continues to step 440. Those with skill in the art will appreciate that the present invention also includes simultaneously searching both file system 22 and file system data structure 24 for the requested filename and does not require the searches of file system 22 and file system data structure 24 be sequential.

Returning to step 432, if the requested file is not found, the process continues to step 434, which illustrates file system manager 212 determining if a search request should be sent out to a remote server including, but not limited to, a search engine implemented utilizing a server coupled to Internet 12 or a file system of a remote computer. If a search request to a remote server should be sent, file system manager 212 sends out the search request, as shown in step 436. The process continues to step 437, which illustrates file system manager 212 determining if the requested file has been found via the search of a remote server. If the file has been found, the process continues to step 440. If the file has not been found, the process continues to step 438.

Returning to step 434, if file system manager 212 determines that a request should not be sent to a remote computer, if the file is still not found on the remote computer, the process continues to step 438, which shows file system manager 212 returning a "file not found" message to the requesting application. The process then continues to step 410.

Returning to step 412, if file system manager 212 has not received a request to search file system 22 for a file by filename, the process continues to step 414, which illustrates file system manager 212 determining if a request to rename an existing file within file system 22 has been received from an application. If a request to rename an existing file has been received from an application, the process continues to step 416, which depicts file system manager 212 copying the old name of the file to a previous filename field (e.g., previous filename 1 field 302a). The process continues to step 418, which shows file system manager 212 inserting the new name of the file into the current filename field (e.g., current filename 300a). The process proceeds to step 410.

Returning to step 414, if file system manager 212 has not received a request to rename an existing file within file system 210, the process continues to step 420, which illustrates file system manager 212 determining if a request has been received from an application to relocate and existing file within file system 210. If a request from an application to relocate an existing file within file system 210 has been received by file system manager 412, the process continues to step 422, which illustrates file system manager 212 inserting the old location of the file in a previous location field (e.g., previous location 1 302b). The process continues to step 424, which depicts file system manager 212 inserting the new location of the file in the current location field (e.g., current location field 300b). The process continues to step 410.

If file system manager 212 has not received a request to relocate an existing file within file system 210, the process continues to step 426, which shows file system manager 426 performing other processing. The process continues to step 410, which illustrates file system manager 212 determining if the process ends. If the process ends, the process proceeds to step 411, which depicts the process ending. If the process continues, the process returns to step 402.

As discussed, the present invention includes a system, method, and computer-implementable method for aiding file searching within a file service by indexing historical filenames and locations. In response to receiving a request to alter a first name corresponding to a file within the file system to a second name, a file system manager associates the second name to the first name and to the file within the file system data structure. When receiving a request for a file, wherein the request includes the first name, the file system manager searches the file system for the file based on the first name. When determining the search based on the first name is not successful, the file system manager searches the file system data structure for the file based on the second name. When the second name is located within the file system data structure, the file system manager returns the file utilizing the second name as listed in the file system data structure, to fulfill the request.

It should be understood that at least some aspects of the present invention may alternatively be implemented in a computer-usable medium that contains a program product. Programs defining functions in the present invention can be delivered to a data storage system or a computer system via a variety of signal-bearing media, which include, without limitation, non-writable storage media (e.g., CD-ROM), writable storage media (e.g., hard disk drive, read/write CD-ROM, optical media), system memory such as, but not limited to random access memory (RAM), and communication media, such as computer and telephone networks, including Ethernet, the Internet, wireless networks, and like networks. It should be understood, therefore, that such signal-bearing media, when carrying or encoding computer-readable instructions that direct method functions in the present invention, represent alternative embodiments of the present invention. Further, it is understood that the present invention may be implemented by a system having means in the form of hardware, software, or a combination of software and hardware as described herein or their equivalent.

While the present invention has been particularly shown and described with reference to a preferred embodiment, it will be understood by those skilled in the art that various changes in form and detail may be made therein without departing from the spirit and scope of the invention.

What is claimed is:

1. A computer-implemented method for locating files on a network, said method performed on a computer system and comprising:

in response to receiving a request to alter a first name corresponding to a file within a file system to a second name, a file system manager executing on a processor of the computer system dynamically associating said second name to said first name and said file within a file system data structure, which structure comprises one or more alternate name fields associated with said file, including the first name and the second name;

in response to an operation that destroys or deletes or removes the file associated with the first name, the file system manager dynamically updating a file destroyed field associated with the file within the file system data structure, wherein the file destroyed field is one field in addition to the one or more alternate name fields associated with said file within the file system data structure;

in response to receiving a request for said file, wherein said request includes said first name, the file system manager searching said file system for said file based on said first name;

in response to determining said search for said file based on said first name is not successful, the file system manager:

dynamically retrieving the associated second name;

checking a value of the file destroyed field corresponding to the second name to determine whether or not the file being requested has been removed or destroyed, wherein when the file has been removed, including all copies of the file with the first name and with alternate names and/or locations, the file destroyed field will indicate a negative value, and wherein the file destroyed field indicates a positive value when all copies of the file have not been removed or destroyed; and searching said file system data structure for said file based on said second name associated with the first name on which the search is based;

wherein said searching said file system data structure for said file based on said second name further comprises:

searching said file system data structure under the one or more alternate name fields;

in response to locating said second name within said file system data structure, the file system manager returning said file to fulfill said request; and in response to determining that said file has been removed or destroyed or that said searching said file system data structure for said file based on said second name is not successful at the file system being searched, the file system manager sending said request to a remote server via a network to execute said search for the file on one or more remote databases.

2. The method according to claim 1, further comprising:

in response to receiving a request to relocate said file from a first location to a second location within said file system, the file system manager associating said second location to said file within said file system data structure; and in response to receiving a search request for the file, determining if the search request for said file should be sent out to a remote server, wherein the remote server comprises a search engine implemented utilizing a server coupled to the Internet or to a file system of a remote computer.

3. The method according to claim 1, further comprising:

in response to receiving a file save request for a new file, the file system manager saving the new file in said file system and creating a new record in said file system data structure associated to said new file.

4. The method of claim 1, further comprising:

in response to changing the name of the file, the file system manager renaming the file within the file system, inserting an original name of the file in a previous filename field, and inserting a new name of the file in a current filename field.

5. The method of claim 4, further comprising:

in response to detecting a request to rename the file, the file system manager inserting each previous name of the file in previous filename fields in one or more records within the file system data structure;

the file system manager dynamically adding additional previous filename fields to each record, as required; and the file system manager ordering the previous filename/location fields within the one or more records of the file system data structure to facilitate searching of the fields when searching for prior filenames/locations, wherein when a most recent filename/location is desired to be held within a first field, the fields are sorted starting from the one containing the most recent filename/location record.

6. The method of claim 1, further comprising:
in response to receiving a request to change the location of the file, the file system manager relocating the file within the file system and inserting a path of an original location in a previous location field;
the file system manager inserting a new path of the file in a current location field;
inserting prior locations into previous location fields in the records within the file system data structure each time the file is relocated; and
the file system manager dynamically adding additional previous location fields to each record.

7. The method of claim 1, wherein the file is not a web page.

8. A system for locating files on a network, said system comprising:
at least one processor;
a system interconnect coupled to said at least one processor; and
a computer usable storage medium embodying computer program code, said computer usable storage medium being coupled to said system interconnect, said computer program code comprising instructions executable by said at least one processor and configured for:
in response to receiving a request to alter a first name corresponding to a file within a file system to a second name, dynamically associating said second name to said first name and said file within a file system data structure, which structure comprises one or more alternate name fields associated with said file, including the first name and the second name;
in response to an operation that destroys or deletes or removes the file associated with the first name, the file system manager dynamically updating a file destroyed field associated with the file within the file system data structure, wherein the file destroyed field is one field in addition to the one or more alternate name fields associated with said file within the file system data structure;
in response to receiving a request for said file, wherein said request includes said first name, searching said file system for said file based on said first name;
in response to determining said search for said file based on said first name is not successful, the file system manager:
dynamically retrieving the associated second name;
checking a value of the file destroyed field corresponding to the second name to determine whether or not the file being requested has been removed or destroyed, wherein when the file has been removed, including all copies of the file with the first name and with alternate names and/or locations, the file destroyed field will indicate a negative value, and wherein the file destroyed field indicates a positive value when all copies of the file have not been removed or destroyed; and
searching said file system data structure for said file based on said second name associated with the first name on which the search is based;
searching said file system data structure for said file based on said second name further comprises searching said file system data structure under the one or more alternate name fields;
in response to locating said second name within said file system data structure, returning said file to fulfill said request; and
in response to determining that said file has been removed or destroyed or that said searching said file system data structure for said file based on said second name is not successful at the file system being searched, sending said request to a remote server via a network to execute said search for the file on one or more remote databases.

9. The system according to claim 8, wherein said instructions are further configured for:
in response to receiving a request to relocate said file from a first location to a second location within said file system, associating said second location to said file within said file system data structure; and
in response to receiving a search request for the file, determining if the search request for said file should be sent out to a remote server, wherein the remote server comprises a search engine implemented utilizing a server coupled to the Internet or to a file system of a remote computer.

10. The system according to claim 8, wherein said instructions are further configured for:
in response to receiving a file save request for a new file, saving the new file in said file system and creating a new record in said file system data structure associated to said new file.

11. The system of claim 8, wherein said instructions are further configured for:
in response to changing the name of the file, renaming the file within the file system, inserting an original name of the file in a previous filename field, and inserting a new name of the file in a current filename field;
in response to detecting a request to rename the file, inserting each previous name of the file in previous filename fields in one or more records within the file system data structure;
dynamically adding additional previous filename fields to each record, as required; and
ordering the previous filename/location fields within the one or more records of the file system data structure to facilitate searching of the fields when searching for prior filenames/locations, wherein when a most recent filename/location is desired to be held within a first field, the fields are sorted starting from the one containing the most recent filename/location record.

12. The system of claim 8, wherein said instructions are further configured for:
in response to receiving a request to change the location of the file, relocating the file within the file system and inserting a path of an original location in a previous location field;
inserting a new path of the file in a current location field;
inserting prior locations into previous location fields in the records within the file system data structure each time the file is relocated; and
dynamically adding additional previous location fields to each record.

13. A computer usable storage medium embodying computer program code, said computer program code comprising computer executable instructions that are executed by a processor of a computer system to provide the functions of:
in response to receiving a request to alter a first name corresponding to a file within a file system to a second name, dynamically associating said second name to said first name and said file within a file system data structure, which structure comprises one or more alternate name fields associated with said file, including the first name and the second name;

in response to an operation that destroys or deletes or removes the file associated with the first name, the file system manager dynamically updating a file destroyed field associated with the file within the file system data structure, wherein the file destroyed field is one field in addition to the one or more alternate name fields associated with said file within the file system data structure;

in response to receiving a request for said file, wherein said request includes said first name, searching said file system for said file based on said first name;

in response to determining said search for said file based on said first name is not successful, the file system manager:

dynamically retrieving the associated second name;

checking a value of the file destroyed field corresponding to the second name to determine whether or not the file being requested has been removed or destroyed, wherein when the file has been removed, including all copies of the file with the first name and with alternate names and/or locations, the file destroyed field will indicate a negative value, and wherein the file destroyed field indicates a positive value when all copies of the file have not been removed or destroyed; and searching said file system data structure for said file based on said second name associated with the first name on which the search is based;

wherein the searching of the file system data structure based on the second name includes searching said file system data structure under the one or more alternate name fields;

in response to locating said second name within said file system data structure, returning said file to fulfill said request; and in response to determining that said file has been removed or destroyed or that said searching said file system data structure for said file based on said second name is not successful at the file system being searched, sending said request to a remote server via a network.

14. The computer usable storage medium according to claim 13, wherein said embodied computer program code further comprises computer executable instructions configured for:

in response to receiving a request to relocate said file from a first location to a second location within said file system, associating said second location to said file within said file system data structure; and in response to receiving a search request for the file, determining if the search request for said file should be sent out to a remote server, wherein the remote server comprises a search engine implemented utilizing a server coupled to the Internet or to a file system of a remote computer.

15. The computer usable storage medium according to claim 13, wherein said embodied computer program code further comprises computer executable instructions configured for:

in response to receiving a file save request for a new file, saving the new file in said file system and creating a new record in said file system data structure associated to said new file.

16. The computer usable storage medium of claim 11, wherein said embodied computer program code further comprises computer executable instructions configured for:

in response to changing the name of the file, renaming the file within the file system, inserting an original name of the file in a previous filename field, and inserting a new name of the file in a current filename field;

in response to detecting a request to rename the file, inserting each previous name of the file in previous filename fields in one or more records within the file system data structure;

dynamically adding additional previous filename fields to each record, as required; and ordering the previous filename/location fields within the one or more records of the file system data structure to facilitate searching of the fields when searching for prior filenames/locations, wherein when a most recent filename/location is desired to be held within a first field, the fields are sorted starting from the one containing the most recent filename/location record.

17. The computer usable storage medium of claim 13, wherein said embodied computer program code further comprises computer executable instructions configured for:

in response to receiving a request to change the location of the file, relocating the file within the file system and inserting a path of an original location in a previous location field;

inserting a new path of the file in a current location field;

inserting prior locations into previous location fields in the records within the file system data structure each time the file is relocated; and dynamically adding additional previous location fields to each record.

* * * * *